Patented May 13, 1941

2,241,422

UNITED STATES PATENT OFFICE 2,241,422

TERPENE- AND ROSIN-MODIFIED PHENOL-KETONE - FORMALDEHYDE RESIN AND METHOD OF PREPARING SAME

Israel Rosenblum, New York, N. Y.

No Drawing. Application March 2, 1938,
Serial No. 193,448

15 Claims. (Cl. 260—25)

My invention relates to synthetic resins suitable for the manufacture of coating compositions, and more particularly to the production of oil-soluble resins composed of a phenol, a ketone, and an aldehyde, a liquid terpenic material and an acidic natural resin, with or without a neutralizing agent, such as glycerol.

The present application is a continuation-in-part of my copending applications Ser. No. 538,248, filed May 18, 1931; Ser. No. 580,495, filed December 11, 1931; Ser. No. 594,379, filed February 20, 1932; and Ser. No. 628,298, filed August 11, 1932.

Resins composed of a phenol, a ketone and an aldehyde, especially formaldehyde, are not soluble in oily glyceridic esters, such as varnish oils, but their presence in varnishes is highly desirable because of their high melting point, durability and color stability. On the other hand, rosin and other acidic natural resins and their glycerol esters are readily soluble in varnish oils, but the films obtained therewith are not entirely satisfactory, among other reasons, because of their low degree of hardness and durability.

It is, moreover, desirable to incorporate relatively large proportions of formaldehyde in a phenolic resin which is to be employed in a coating composition because with such higher proportions of formaldehyde, a harder and more durable resin is generally obtained. Higher proportions of formaldehyde, however, render the phenolic condensate, including those made with a ketone, even less compatible with varnish oils. These high formaldehyde resins are difficult to incorporate in oils even with the aid of rosin or ester gum, for the phenol-ketone-formaldehyde condensate is thermo-setting in character and shows a strong tendency to precipitate out when heated with rosin or ester gum. This is particularly true when it is sought to incorporate relatively large proportions, say 8 to 20% of the phenolic resin in the ester gum; when the formaldehyde content is high, for example 1½ mols to each mol of phenol, it is even more difficult to combine the phenolic resin with the ester gum and the latter will keep in suspension only small proportions of the phenolic resin.

It is accordingly the general object of the invention to provide an improved process whereby condensates of a phenol, a ketone and an aldehyde, preferably formaldehyde, in such proportions and condensed under such conditions as to yield a thermo-setting resin may be combined in relatively large amounts with rosin or esterified rosin or equivalent acidic natural resin and yield a resinous composition which is soluble in varnish oils, such composition being of improved character, as compared with the rosin or rosin ester, in respect of durability, alkali-proofness and melting point by reason of its content of phenol-ketone-aldehyde condensate, the product being distinguished from known combinations of a phenol-formaldehyde condensate with rosin or rosin ester, among other things, by its color stability.

It is also an object of the invention to produce an oil-soluble resinous composition which in the form of an oil varnish, such as a solution in linseed oil, has the property of drying on porous surfaces without penetrating the same, thereby making the varnish useful for "overprinting" purposes. Other objects will be apparent from the more detailed description of the invention hereinafter.

According to the present invention the condensation product of a phenol, a ketone and an aldehyde, the phenol being preferably first condensed with the ketone in known manner, is combined with or incorporated in rosin or ester gum with the aid of a liquid terpene, preferably one boiling higher than turpentine, for example, dipentene, pine oil, terpineol, and the like. I have found that with the aid of the terpenic material proportions of phenol, ketone and aldehyde which would ordinarily yield a thermo-setting resin which could not be readily combined with rosin to any considerable extent to form a homogeneous composition, can be readily dissolved in or combined with rosin in relatively high proportion and even when the proportion of aldehyde, such as formaldehyde to phenol is relatively high, and even when the phenol is one which, like ordinary phenol, yields insoluble resins when combined with approximately equimolecular or greater proportions of formaldehyde. The liquid terpenic material is preferably employed in relatively large amount, that is, in quantities of the order of the amount of phenol employed, and even more, since it acts as a very desirable solvent during the initial stages of the reaction. The influence of the liquid terpene is not however limited to its solvent action; the terpene appears to take part in the reaction, for as much as about 10% of the liquid terpene based upon the weight of the combined resin remains incorporated in the solid product and cannot be expelled even upon heating to temperatures considerably above the normal boiling point of the terpene. It appears therefore that the liquid terpene acts to modify the phenol-ketone-formaldehyde condensate and perhaps also the rosin, in such a manner as to render these materials more compatible with each other and the resulting resin readily soluble in varnish oils.

It has already been suggested to incorporate a phenol-acetone-formaldehyde resin in rosin, after which the mixture is neutralized with glycerol, but in such process very great caution must be employed to avoid precipitation of the phenolic resin; moreover, the phenolic resin is produced with relatively low proportions of formaldehyde. In spite of the fact that the known phenol-acetone-formaldehyde resin is of low reactivity, it must be added to the rosin very slowly and at low temperatures (see United States Patent to Amann and Fenrobert No. 1,623,901, Example 5). By the use of a liquid terpene in accordance with the present invention, far more reactive phenol-ketone-formaldehyde resins, that is resins of the heat-hardening type which become infusible at elevated temperatures, can be easily incorporated in rosin.

In the preferred manner of carrying out the invention, the phenol and ketone are first condensed to produce a diphenylol or homologous compound. This material is then condensed with a proportion of formaldehyde ranging from about 1 to 3 mols to each mol of phenolic material combined with the ketone, in the presence of colophony and of a liquid terpene, such as dipentene. If desired, the phenol-ketone compound and the formaldehyde may first be condensed in the presence of the liquid terpene and then heated with the rosin. In any event, the product is dehydrated up to temperatures of 180° C., the phenolic material remaining in solution or colloidal suspension, the product being then neutralized, if desired. Whether neutralized or not, the resinous mass is heated at elevated temperatures to expel excess liquid terpene, a considerable proportion, up to about 10% by weight of the product, remaining however chemically incorporated therein.

The invention will be further described in greater detail by way of the following examples which are presented for purposes of illustration only.

Example 1

| | Grams |
|---|---|
| Rosin | 1000 |
| Diphenylolpropane | 140 |
| 40% formaldehyde solution | 280 |
| (3 mols for each mol of original phenol) | |
| Dipentene | 200 |
| Zinc acetate | 6 | are heated together for about twelve hours at the boiling temperature under reflux (about 100° C.) or at about 110° C. in a closed vessel at about ten pounds pressure. The water is then expelled at elevating the temperature, the temperature being gradually increased until at about 180° C. an amount of glycerol corresponding to about 10% by weight of the rosin is added. The heating is continued at 180° C. and gradually raised to about 250° C. at which temperature the esterification is completed. A very hard resin is obtained which has a melting point of about 125° C. and contains about 5 to 10% of dipentene referred to the total weight of the resin, the dipentene being at least partly in chemical combination. The resin is highly suitable for the manufacture of quick drying and highly resistant wood oil varnishes, and with linseed oil yields a varnish which is characterized, among other things, by non-penetration when applied to porous surfaces.

The diphenylolpropane is prepared in known manner by condensing two molecular proportions of phenol with one of acetone in the presence of a strong mineral acid such as hydrochloric.

Example 2

| | Grams |
|---|---|
| Rosin | 1000 |
| Diphenylolpropane | 200 |
| 40% formaldehyde solution | 200 |
| (1½ mols to each mol of original phenol) | |
| Dipentene | 200 |
| Zinc acetate | 6 | are heated in the manner set forth in Example 1, the initial reaction product being dehydrated by heating up to 180°, at which temperature there are added

| | Grams |
|---|---|
| Glycerol | 100 |
| Dipentene | 100 | and the temperature gradually raised to 250° C. and the heating continued until the esterification is complete. The product obtained has a high melting point, having a higher proportion of phenolic resin than the product of Example 1, and like the latter produces with vegetable oils highly resistant varnishes, the linseed oil varnish being especially characterized by non-penetration.

Example 3

| | Grams |
|---|---|
| Rosin | 1000 |
| Diphenylolpropane | 175 |
| 40% formaldehyde solution | 240 |
| (2 mols for each mol of original phenol) | |
| Dipentene | 300 |
| Glycerol | 110 |
| Zinc acetate | 5 | are condensed as described in Example 1, the initial reaction product being gradually heated without interruption to about 250° C. at which temperature the esterification is completed. A resin of similarly low acid number (below 15) is obtained which like the products of the preceding examples, is soluble in various varnish oils.

The diphenylolpropane may be replaced in whole or in part by any other suitable condensation product of a phenol and a ketone such as the condensates of cresols, xylenols, the higher phenol homologues such as butyl and amyl phenols, etc., with acetone, methyl acetone, methyl ethyl ketone, diacetone alcohol, cyclohexanone, acetophenone and other aliphatic and cyclic ketones.

Although the acidic quality of the rosin causes this material to act somewhat in the nature of a catalyst, I prefer to employ an additional substance having catalytic action, as will be noted in the above examples. The various compounds of zinc, such as the oxide, chloride, acetate, abietate, stearate, etc. have proved to be highly satisfactory, but other catalysts may be employed, including acid, basic and neutral inorganic and organic substances, or combinations of different catalysts used in succession, as is well known in the art. If the catalyst is or forms water soluble material, it may be washed out before the dehydration of the initial condensation product.

Under the conditions of the reactions above described, the dipentene has the effect of rendering the phenol-ketone-formaldehyde reaction product, which otherwise would be thermo-setting and would tend to separate out, compatible with the rosin and the rosin ester in spite of the relatively high proportion of phenolic condensate and the high molecular ratio of formaldehyde. This effect is undoubtedly due to chemical action of the dipentene on the phenolic condensate since the residual portion of dipentene, as already stated cannot be expelled even at temperatures above its normal boiling point.

The dipentene can be replaced in whole or in part by other liquid terpenes, preferably those boiling above the boiling point of turpentine and particularly pine oil, terpineol and the other individual components of pine oil. While in the above examples the products are ultimately esterified with glycerol, such neutralization is not absolutely necessary. Thus, the initial condensate may be dehydrated and either neutralized only in part or not at all and the acidic product can then, for example, be run into ester gum, the acidity of the mixture being thus considerably lower than that of the original condensate. The rosin may be replaced by other acidic resins, especially cracked copal resins.

The resins described hereinabove yield solutions of high viscosity and have a limited solubility in petroleum thinners like mineral spirits. The varnishes yield films of good body and unusually good color retention. As indicated in the above examples, the process may be carried out in two main stages or in a single stage. The various substances can be brought into reaction in different orders except that it is preferable to condense the phenol and ketone prior to mixing with any of the other materials.

The formaldehyde employed in the above examples may be replaced in whole or in part by other aldehydes but best results are usually obtained with formaldehyde alone.

I claim:

1. The method of producing an oil-soluble, phenolic resin which is capable of yielding non-penetrating varnishes, which comprises reacting a phenol, a ketone, formaldehyde, an acidic natural resin and a terpenic material of the group consisting of dipentene and terpineol until an initial resinous condensate is obtained, the molecular proportion of formaldehyde to phenol being at least 1:1, and then elevating the temperature to dehydate the mass, the natural resin being employed in about 3 to 4 times the combined weights of the phenol, ketone and formaldehyde.

2. The method of producing an oil-soluble, phenolic resin which is capable of yielding non-penetrating varnishes, which comprises reacting a condensate of acetone and a phenol of the type which forms oil-insoluble resins with an equimolecular or greater proportion of formaldehyde, with formaldehyde, an acidic natural resin, and dipentene until an initial resinous condensate is obtained, the molecular proportion of formaldehyde to original phenol being at least 1:1, and then elevating the temperature to dehydrate the mass, the natural resin being employed in about 3 to 4 times the combined weights of the phenol, ketone and formaldehyde.

3. The method according to claim 2, wherein glycerol is added to the resinous condensate at a temperature of about 180° C. whereafter the mass is heated to about 250° C to complete the esterification.

4. The method according to claim 2, wherein glycerol is present from the beginning of the reaction, and the temperature is ultimately raised to about 250° C. to effect substantial neutralization of the resin.

5. The method according to claim 2, wherein the phenol is ordinary phenol and the proportion of phenol-ketone-formaldehyde condensate in the resinous reaction product is about 10 to 20%.

6. The method of producing oil-soluble combinations of a phenol, a ketone and formaldehyde which are capable of yielding non-penetrating varnishes which comprises reacting a phenol of the type which forms oil-insoluble resins with an equimolecular or greater proportion of formaldehyde, with acetone and at least a sesqui-molecular proportion of formaldehyde in the presence of a terpene material of the group consisting of dipentene and terpineol, heating the condensate in the presence of rosin to temperatures sufficient to cause dehydration, and then neutralizing the mass with glycerol.

7. The method of producing oil-soluble combinations of a phenol, a ketone and formaldehyde which are capable of yielding non-penetrating varnishes which comprises reacting one mol of diphenylolpropane with at least 3 mols of formaldehyde in the presence of rosin and of a quantity of dipentene of the order of the weight of phenol, dehydrating the mass and then reacting the same with a sufficient amount of glycerol to produce an approximately neutral resin.

8. The method according to claim 1, wherein the condensation takes place in the presence of a relatively small proportion of a zinc compound.

9. A synthetic resin capable of forming a highly viscous solution in a 1:1 mixture of mineral spirits and soluble in varnish oils, said resin comprising the reaction product of a phenol, a ketone, formaldehyde, a natural acidic resin, a terpenic material of the group consisting of dipentene and terpineol, and glycerol, the phenol being of the type which does not form oil-soluble resins with equimolecular proportions of formaldehyde, and the formaldehyde being present in at least about sesqui-molecular proportion with reference to the phenol, while the esterified natural resin is present in several times the combined amounts of phenol, ketone and formaldehyde.

10. A resinous phenolic condensate soluble in varnish oils and comprising the reaction product of about 1 mol of diphenylolpropane, at least 3 mols of formaldehyde, dipentene in an amount of the order of the diphenylolpropane, and rosin.

11. A resinous phenolic condensate soluble in varnish oils and comprising the substantially neutralized reaction product of about 1 mol of diphenylolpropane, at least 3 mols of formaldehyde, a compound of zinc, dipentene in an amount of the order of the diphenylolpropane, and rosin.

12. An oil-soluble resin capable of forming non-penetrating varnishes with linseed oil and comprising the neutralized reaction product of approximately 1000 parts of rosin, 140 to 200 parts of diphenylolpropane, 200 to 280 parts of 40% formaldehyde solution, and 200 to 300 parts of dipentene.

13. A non-penetrating coating composition comprising a drying varnish oil having incorporated therein a neutralized condensate of about 1 mol of diphenylolpropane, at least 3 mols of formaldehyde, a member of the group consisting of dipentene and terpineol in an amount of the order of the diphenylolpropane, and rosin.

14. The method of producing an oil-soluble, phenolic resin which is capable of yielding non-penetrating varnishes, which comprises reacting diphenylolpropane, formaldehyde and a terpenic material of the group consisting of dipentene and terpineol until an initial condensate is obtained, the molecular proportion of formaldehyde to diphenylolpropane being at least 2:1, and thereafter heating the condensate with a quantity of rosin equal to several times the combined weight of diphenylolpropane and formaldehyde, the heating being continued until excess terpenic material is expelled.

15. A resinous phenolic condensate soluble in varnish oils and comprising the reaction product of (1) the initial condensate of 1 mol of diphenylolpropane, at least 2 mols of formaldehyde, and a member of the group consisting of dipentene and terpineol, and (2) rosin, the latter being present in at least several times the combined weight of the diphenylolpropane and formaldehyde.

ISRAEL ROSENBLUM.